(12) United States Patent
Grindle

(10) Patent No.: US 7,789,451 B2
(45) Date of Patent: *Sep. 7, 2010

(54) WINDOW SCREEN FOR VEHICLES

(76) Inventor: Dan Grindle, 513 Market St., P.O. Box A, Danville, OH (US) 43014

(*) Notice: Subject to any disclaimer, the term of this patent is extended or adjusted under 35 U.S.C. 154(b) by 120 days.

This patent is subject to a terminal disclaimer.

(21) Appl. No.: 12/250,095

(22) Filed: Oct. 13, 2008

(65) Prior Publication Data
US 2009/0032202 A1 Feb. 5, 2009

Related U.S. Application Data

(63) Continuation of application No. 11/421,821, filed on Jun. 2, 2006, now Pat. No. 7,452,025.

(51) Int. Cl.
*B60J 7/00* (2006.01)
*E06B 3/32* (2006.01)

(52) U.S. Cl. .................................. 296/152; 160/105
(58) Field of Classification Search ................ 296/152; 160/105, 371
See application file for complete search history.

(56) References Cited

U.S. PATENT DOCUMENTS

| 4,913,212 | A | 4/1990 | Clavier |
| 7,452,025 | B2 | 11/2008 | Grindle |
| 2007/0222255 | A1 | 9/2007 | Grindle |

*Primary Examiner*—Joseph D Pape
(74) *Attorney, Agent, or Firm*—McNees Wallace & Nurick, LLC

(57) ABSTRACT

A ventilation device for use with vehicle windows is provided. This device includes an adjustable frame mountable within a vehicle window; an insert mountable within the frame; and an adapter, wherein adapter is attachable to the frame and further includes a plurality of score lines formed therein for facilitating changing the dimensions of the adapter, if necessary, based on the dimensions of the window opening in which the device is being used.

18 Claims, 3 Drawing Sheets

WINDOW SCREEN FOR VEHICLES

CROSS-REFERENCE TO RELATED APPLICATIONS

This patent application is a continuation of U.S. Utility Application No. 60/784,178, filed on Jun. 2, 2006, entitled "Window Insert for Vehicles," the disclosure of which is incorporated as if fully written herein.

BACKGROUND OF THE INVENTION

The present invention relates in general to ventilation devices that are inserted into or otherwise installed in or used with windows, and more specifically to an adaptable, ventilating insert for use with the windows of trucks, tractor-trailer rigs and the like.

Truck drivers often rest or sleep in the cabs of their vehicles. To avoid running the vehicle's engine to power an air-conditioner unit, the driver may wish to open at least one of the vehicle's windows to provide ventilation to the interior of the cab. An open window, however, may create as many problems as it solves because insects, the elements, thieves, and other intruders can access the interior of the cab. Thus, there is a need for a system and/or device that allows the operator of a truck or similar vehicle to ventilate the interior of the vehicle's cab without compromising privacy, security, and safety. Such a system or device would also prevent unwanted insects and birds from entering the ventilated cab and would allow the operator of a truck to rest or sleep in the vehicle's cab more peacefully and comfortably than a partially or completely open window would permit.

SUMMARY OF INVENTION

The following provides a summary of exemplary embodiments of the present invention. This summary is not an extensive overview and is not intended to identify key or critical aspects or elements of the present invention or to delineate its scope.

In accordance with one aspect of the present invention, a ventilation system for use with vehicle windows is provided. This system includes a frame mountable within the opening of a vehicle window; an insert mountable within the frame; and an adapter. The adapter is attachable to the frame and further includes a plurality of score lines formed therein for allowing the size and shape of the adapter to be changed to accommodate different window sizes.

In accordance with another aspect of the present invention, a device for use with vehicle windows is provided. This device includes a frame having an aperture formed therein. The frame further includes a substantially linear top edge; a substantially linear bottom edge having a plurality of mounting flanges formed thereon; a rear panel that further includes a top extension and a bottom extension; and a front panel that further includes a plurality of score lines formed therein for facilitating dimensional changes to the front panel. This device also includes a ventilation insert mountable with the aperture formed in the frame, and an adapter. The adapter is attachable to the frame and further includes a plurality of score lines formed therein. The score lines facilitate changing the dimensions, i.e., the width and height, of the adapter so that the device may be used in windows of different shapes and sizes.

In accordance with still another aspect of the present invention, a method for ventilating the interior of a vehicle is provided. This method includes the steps of lowering a vehicle window to a predetermined height; placing a device in the window, wherein the device further comprises: a frame; an insert mountable within the frame; and an adapter that is attachable to the frame and that further includes a plurality of score lines formed therein for facilitate changing the dimensions of the adapter; raising the window to a height appropriate for securing the device in the window; and adjusting the position of the adapter to fill a portion of the window not filled by the frame.

Additional features and aspects of the present invention will become apparent to those of ordinary skill in the art upon reading and understanding the following detailed description of the exemplary embodiments. As will be appreciated, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

Figure 1:
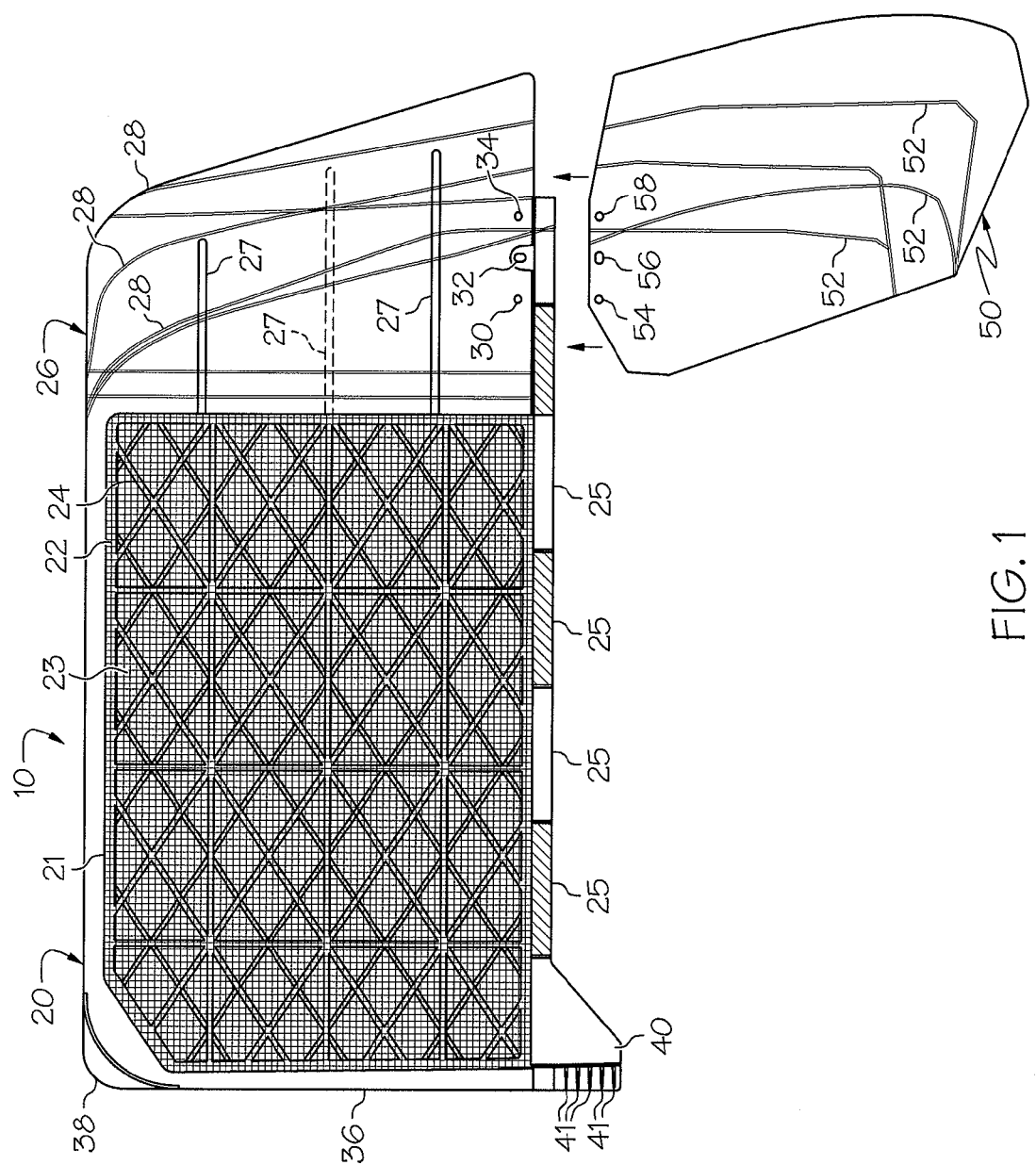
FIG. 1 is a side view of an exemplary embodiment of the window insert of the present invention showing the adaptor detached from the frame portion of the window insert.

Exemplary embodiments of the present invention are now described with reference to the Figures. Reference numerals are used throughout the detailed description to refer to the various elements and structures. Although the following detailed description contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates to ventilating systems and devices for use with vehicle windows, and particularly those windows without vent posts. A first embodiment of this invention provides a ventilation system for use with vehicle windows. This system includes a frame mountable within the opening of a vehicle window; an insert mountable within the frame; and an adapter. The adapter is attachable to the frame and further includes a plurality of score lines formed therein for facilitating changing the dimensions of the adapter, if necessary. A second embodiment of this invention provides a device for use with vehicle windows. This device includes a frame having an aperture formed therein. The frame further includes a substantially linear top edge; a substantially linear bottom edge having a plurality of mounting flanges formed thereon; a rear panel that further includes a top extension and a bottom extension; and a front panel that further includes a plurality of score lines formed therein for facilitating changing the dimensions of the front panel, if necessary. This device also includes an insert mountable within the aperture formed in the frame; and an adapter. The adapter is attachable to the frame and further includes a plurality of score lines formed therein, which facilitate changing the dimensions of the adapter, if necessary. A third embodiment of this invention provides a method for ventilating the interior of a vehicle, comprising the steps of lowering a vehicle window to a predetermined height; placing a device in the window, wherein the device further comprises: a frame; an ventilating insert mountable within the frame; and an adapter that is attachable to the frame and that further includes a plurality of score lines formed therein for facilitate changing the dimensions of the adapter; raising the window to a height appropriate for securing the device in the window; and adjusting the position of the adapter to fill a portion of the window not filled by the frame.

With reference now to the Figures, FIG. 1 provides a side-view of an exemplary embodiment of the ventilation system of the present invention. In this view, window insert 10 is oriented for insertion into the passenger side of a vehicle, thus the "rear" portion of window insert 10 appears on the left side of the Figure and the "front" portion of window insert 10 appears on the right side of the figure. In this embodiment, window insert 10 includes a frame portion 20 and an attachable adapter 50, which allows window insert 10 to be used with a variety of window sizes and vehicle types. When properly installed in a window opening, this embodiment of window insert 10 provides ventilation through a screened portion while simultaneously blocking-off the non-ventilated portions of the window opening.

Figure 2:
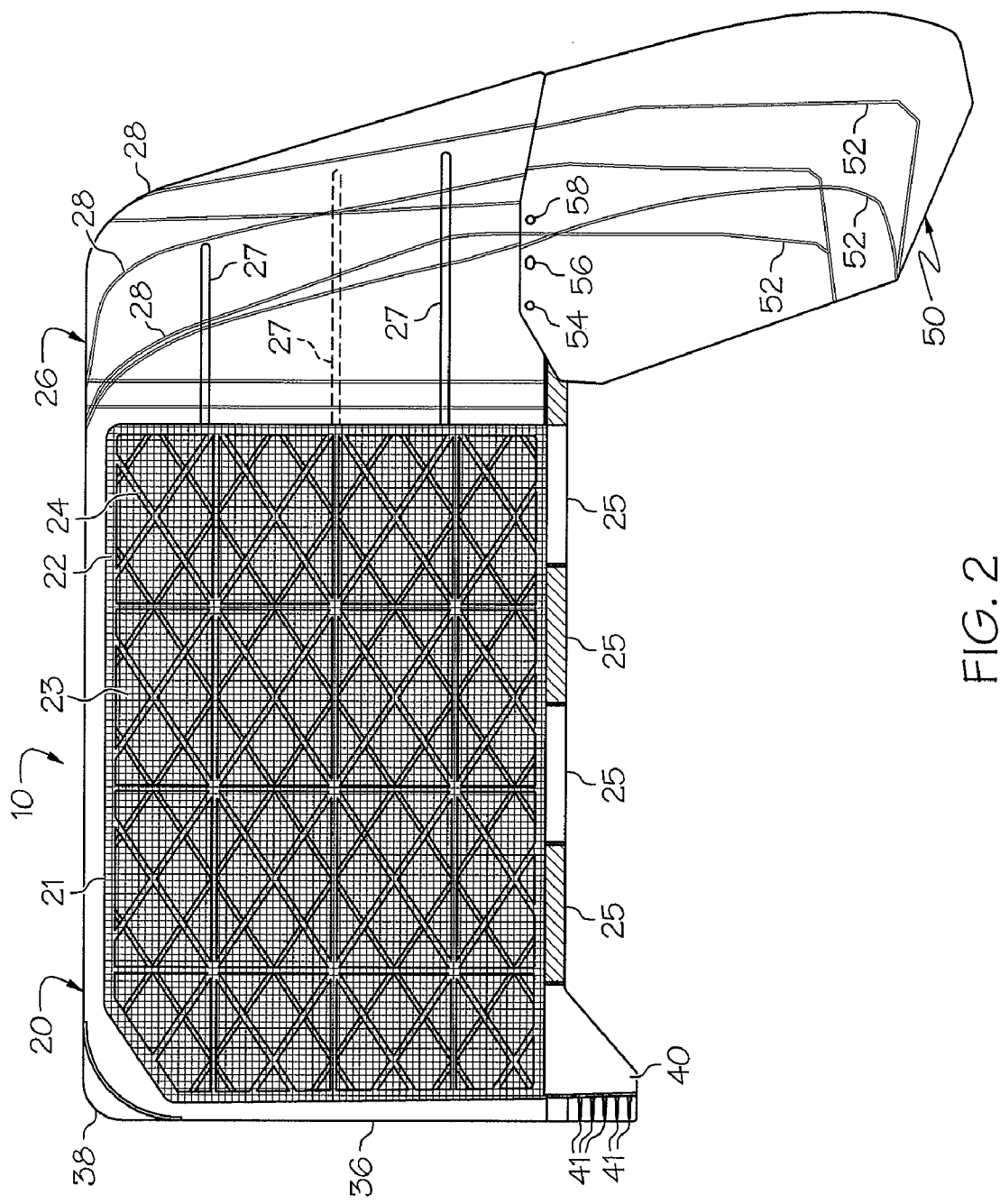
FIG. 2 is a side view of the window insert illustrated in FIG. 1 showing the adaptor attached to the frame portion of the window insert.

As best shown in FIGS. 1-2, frame 20 is substantially rectangular in shape and includes a rectangular aperture 21, which is adapted to receive an insert that typically includes screen frame 22, screen material 23, and screen supports 24. Screen supports 24 cooperate with one another to form a lattice-like structure for supporting screen material 23. As described in U.S. Pat. No. 4,913,212, the entirety of which is incorporated by reference herein, a mesh screen may be used to cover screen frame 22 and screen supports 24. In other embodiments of the present invention, the screen supports 24 are covered with a substantially impermeable, solid material and at least one aperture, opening, or vent is formed in a portion of window insert 10. In still other embodiments, the entire operative surface of window insert 10 is solid and substantially impermeable, and at least one aperture or vent is formed in a portion of the surface of window insert 10. A ventilating hose, tube, or other device may then be attached to this at least one aperture or vent for the purpose of providing outside air to the interior of the vehicle.

Again with reference to FIGS. 1-2, frame 20 includes a substantially linear top edge and a substantially linear bottom edge. A plurality of substantially rectangular mounting flanges 25, which are offset, front to back, left to right, from one another along the length of the bottom edge (see FIGS. 1-2), are included for the purpose of engaging the top edge of a window and stabilizing window insert 10 when the device is properly installed. A rear panel 36 is formed integrally with frame 20 and includes a removable top extension 38 and a bottom extension 40. Bottom extension 40 further includes a plurality of ridges 41, which provides additional strength and stability to bottom extension 40. Both top extension 38 and bottom extension 40 assist in stabilizing window insert 10 within the frame of a vehicle's door when window insert 10 is properly installed.

As shown in FIGS. 1-2, the front portion of frame 20 also includes a front panel having an integral adapter 26, which permits window insert 10 to be used with a variety of different vehicles having different window opening geometries. Integral adapter 26 further includes a plurality of score lines 28, as well as a plurality of mounting devices, i.e., first pin 30, hook 32, and second pin 34, formed on the lower portion thereof. These mounting devices are formed on both sides of frame 20 so that window insert 10 may be re-oriented and used on either the driver or passenger side of the vehicle. The mounting devices cooperate with a plurality of corresponding mounting apertures, i.e., first mounting aperture 54, second mounting aperture 56, and third mounting aperture 58, to attach adaptor 50 to frame 20. A plurality of ribs 27 is formed in integral adapter 26 for adding strength and stability for this portion of window insert 10. Score lines 28 allow a user of window insert 10 to more easily remove a portion of integral adapter 26 so that frame 20 fits properly into the window opening of a particular vehicle such as, for example, a Kenworth, Peterbilt, Western Star, International, or Mack truck.

Figure 3:
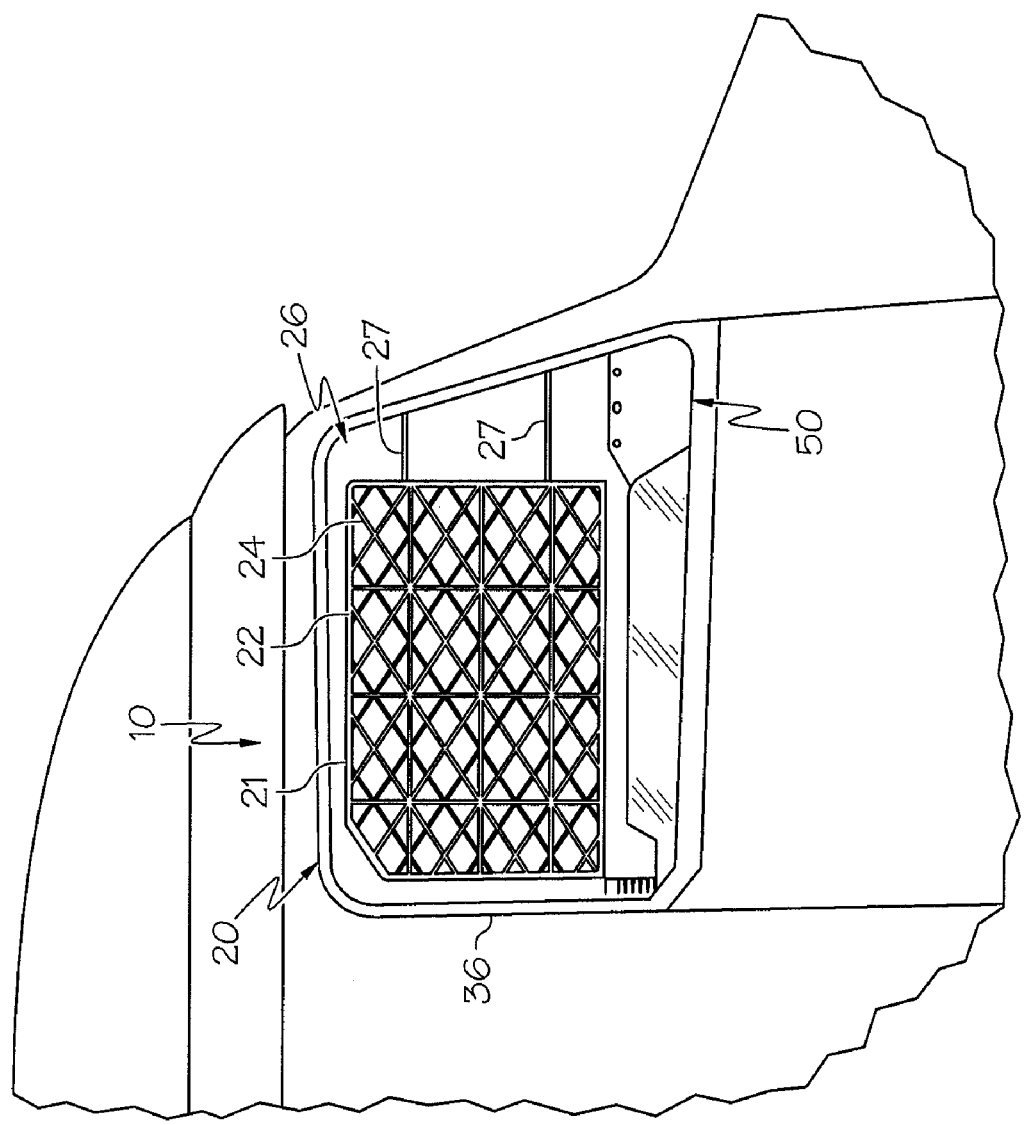
FIG. 3 is a side view of the window insert illustrated in FIG. 1 showing the proper placement of the assembled window insert illustrated in FIGS. 1 and 2 within the window of a vehicle.

As shown in the Figures, an attachable adapter 50 is provided to further accommodate different window opening geometries and to allow the user of window insert 10 to substantially or completely block the portion of an open window that is not ventilated by screen material 23. Attachable adapter 50 also includes a plurality of score lines 52, as well as a first aperture 54, a second aperture 56, and a third aperture 58. Score lines 52 allow the user of window insert 10 to more easily remove a portion of attachable adapter 50 so that the entire window insert 10 fits properly into the window opening of a particular vehicle (see FIG. 3), such as, for example, a Kenworth, Peterbilt, Western Star, International, or Mack truck. The score lines formed in attachable adapter 50 correspond to the score lines formed in integral adapter 26 when the two components are connected to one another. Attachable adapter 50 is connected to integral adapter 26 by placing apertures 54, 56, and 58 over first pin 30, hook 32, and second pin 32 respectively and pressing down to snap attachable adapter 50 into place. For purposes of packaging and storage, attachable adapted 50 may be inverted such that it sits atop integral adapter 26, while still being attached to hook 32. For this purpose, hook 32 also acts as a "hinge" about which attachable adapter 50 may rotate.

The various components of the present invention are typically manufactured from high-impact plastic and/or other acceptable materials according to known manufacturing and fabrication methods and techniques including, but not limited to, injection molding and die cutting. Window insert 10 is typically installed and used to ventilate the interior of a vehicle by trimming both the integral adapter 26 and the attachable adapter 50 to the appropriate size (based on vehicle type); attaching adapter 50 to frame 20 and swinging adapter 50 upward; placing the assembled window insert 10 into the opening between the glass of the window and the door frame; raising the window to engage mounting flanges 25; swinging adapter 50 forward and downward into the bottom of the window opening to block off any space remaining between window insert 10 and the door frame (see FIG. 3). Use of window device 10 may reduce engine wear, save fuel and reduce pollution.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A ventilation system for use with vehicle windows, comprising:
   (a) a rigid or semi-rigid frame adapted to be mountable within a vehicle window, wherein the frame further comprises a plurality of score lines preformed therein, and wherein the score lines facilitate changing vertical dimensions of the frame to accommodate different window sizes and shapes;
   (b) an insert mountable within the frame; and
   (c) a detachable adapter, wherein the adapter is attachable to the frame and further includes a plurality of score lines preformed therein, and wherein the score lines facilitate changing the vertical dimensions of the adapter when necessary to fit a particular window.

2. The ventilation system of claim 1, wherein the frame further comprises:
   (a) an aperture formed therein;
   (b) a substantially linear top edge;
   (c) a substantially linear bottom edge, wherein the bottom edge further includes a plurality of mounting flanges; and
   (d) a rear panel, wherein the rear panel further includes a top extension and a bottom extension.

3. The ventilation system of claim 1, wherein the insert further comprises a substantially solid panel.

4. The ventilation system of claim 1, wherein the insert further comprises a mesh screen.

5. The ventilation system of claim 1, wherein the insert further comprises a supportive lattice, and wherein a mesh screen is mounted on or formed integrally with the supportive lattice.

6. The ventilation system of claim 1, wherein the frame further comprises at least one mounting device, and wherein the adapter further comprises at least one mounting aperture for cooperating with the at least one mounting device for attaching the adapter to the frame.

7. A device for use with vehicle windows, comprising:
   (a) a frame, wherein the frame further includes:
      (i) an aperture formed therein;
      (ii) a substantially linear top edge;
      (iii) a substantially linear bottom edge, wherein the bottom edge further includes a plurality of mounting flanges;
      (iv) a rear panel, wherein the rear panel further includes a top extension and a bottom extension; and
      (v) a front panel, wherein the front panel further includes a plurality of score lines preformed therein, and wherein the score lines facilitate changing vertical dimensions of the front panel;
   (b) an insert mountable with the aperture formed in the frame; and
   (c) a detachable adapter, wherein the adapter is attachable to the frame and further includes a plurality of score lines preformed therein, and wherein the score lines facilitate changing the vertical dimensions of the adapter when necessary to fit a particular window.

8. The screen system of claim 7, wherein the insert further comprises a substantially solid panel.

9. The screen system of claim 7, wherein the insert further comprises a substantially solid panel having at least one ventilating aperture formed therein.

10. The screen system of claim 7, wherein the insert further comprises a mesh screen.

11. The screen system of claim 7, wherein the insert further comprises a mesh screen and a lattice for supporting the mesh screen.

12. The screen system of claim 7, wherein the frame further comprises at least one mounting device, and wherein the adapter further comprises at least one mounting aperture for cooperating with the at least one mounting device for attaching the adapter to the frame.

13. A method for ventilating the interior of a vehicle, comprising:
   (a) lowering a vehicle window to a predetermined height;
   (b) placing a device in the window, wherein the device further comprises:
      (i) a frame, wherein the frame further comprises a plurality of score lines preformed therein, and wherein the score lines facilitate changing the vertical dimensions of the frame to accommodate different window sizes and shapes;
      (ii) a ventilating insert mountable within the frame; and
      (iii) an adapter, wherein the adapter is attachable to the frame and further includes a plurality of score lines preformed therein, and wherein the score lines facilitate changing vertical dimensions of the adapter if necessary;
   (c) raising the window to a height appropriate for securing the device in the window; and
   (d) using the adapter to fill a portion of the window not filled by the frame.

14. The method of claim 13, wherein the frame further comprises:
   (a) a substantially linear top edge;
   (b) a substantially linear bottom edge, wherein the bottom edge further includes a plurality of mounting flanges; and
   (c) a rear panel, wherein the rear panel further includes a top extension and a bottom extension.

15. The method of claim 13, wherein the insert further comprises a supportive lattice, and wherein a mesh screen is mounted on or formed integrally with the supportive lattice.

16. The method of claim 13, wherein the frame further comprises at least one mounting device, and wherein the adapter further comprises at least one mounting aperture for cooperating with the at least one mounting device for attaching the adapter to the frame.

17. The method of claim 13, further comprising trimming the device to a predetermined size prior to inserting the placing the device in the window.

18. The method of claim 13, wherein the vehicle is a truck or the tractor portion of a tractor-trailer rig.

* * * * *